US010267380B2

(12) United States Patent
Franchini et al.

(10) Patent No.: US 10,267,380 B2
(45) Date of Patent: Apr. 23, 2019

(54) POWER TRANSMISSION BELT (71) Applicant: HUTCHINSON, Paris (FR)

(72) Inventors: Elsa Franchini, Chalette sur Loing (FR); Julie Rognon, Saint Cyr sur Loire (FR)

(73) Assignee: HUTCHINSON, Paris (FR)

( * ) Notice: Subject to any disclaimer, the term of this patent is extended or adjusted under 35 U.S.C. 154(b) by 207 days.

(21) Appl. No.: 15/301,017

(22) PCT Filed: Mar. 30, 2015

(86) PCT No.: PCT/IB2015/052327
§ 371 (c)(1),
(2) Date: Sep. 30, 2016

(87) PCT Pub. No.: WO2015/151010
PCT Pub. Date: Oct. 8, 2015

(65) Prior Publication Data
US 2017/0023099 A1    Jan. 26, 2017

(30) Foreign Application Priority Data
Apr. 3, 2014 (FR) .................................. 14 52959

(51) Int. Cl.
*F16G 1/06* (2006.01)
*F16G 1/08* (2006.01)
(Continued)

(52) U.S. Cl.
CPC .............. *F16G 1/12* (2013.01); *B29D 29/08* (2013.01); *F16G 1/06* (2013.01); *F16G 1/08* (2013.01);
(Continued)

(58) Field of Classification Search
CPC .. F16G 5/20; F16G 1/28; C08K 3/013; D07B 2201/2049; B29D 29/08
(Continued)

(56) References Cited

U.S. PATENT DOCUMENTS 3,919,892 A * 11/1975 Ballou .................... F16G 5/14
474/264
4,752,282 A * 6/1988 Habegger ................ F16G 1/16
156/137
(Continued)

FOREIGN PATENT DOCUMENTS

CN      201258943 Y     6/2009
DE  102006025562 A1   12/2007
(Continued)

OTHER PUBLICATIONS

Written Opinion of the International Searching Authority dated Jul. 3, 2015, issued in corresponding International Application No. PCT/IB2015/052327, filed Mar. 30, 2015, 6 pages.
(Continued)

*Primary Examiner* — Henry Y Liu
(74) *Attorney, Agent, or Firm* — Christensen O'Connor Johnson Kindness PLLC (57) ABSTRACT A power transmission belt and a method for manufacturing said belt. The belt includes: a backing layer made of a material with elastomeric behavior; a ventral layer made of a material with elastomeric behavior; a mechanical reinforcement means inserted between the backing layer and the ventral layer comprising a film with thermoplastic transformation surrounding the mechanical reinforcement means, said film comprising at least: a first component physically and/or chemically bonded to at least one component of the backing layer; a second component physically and/or chemically bonded to at least one component of the mechanical reinforcement means; and a third component physically
(Continued)

and/or chemically bonded to at least one component of the ventral layer. The method for manufacturing said belt may advantageously use an anti-sticking means.

22 Claims, 3 Drawing Sheets

(51) Int. Cl.
*F16G 1/10* (2006.01)
*F16G 1/12* (2006.01)
*F16G 1/16* (2006.01)
*F16G 1/28* (2006.01)
*B29D 29/08* (2006.01)

(52) U.S. Cl.
CPC ............ *F16G 1/10* (2013.01); *F16G 1/16* (2013.01); *F16G 1/28* (2013.01)

(58) Field of Classification Search
USPC .................................. 474/205, 260
See application file for complete search history.

(56) References Cited

U.S. PATENT DOCUMENTS

| | | | | |
|---|---|---|---|---|
| 5,971,879 A * | 10/1999 | Westhoff | ............. | B32B 5/26 442/35 |
| 6,443,866 B1 * | 9/2002 | Billups | ............. | F16G 1/28 474/260 |
| 6,920,745 B2 * | 7/2005 | Bruyneel | ............. | D07B 1/0666 57/237 |
| 2007/0232429 A1 * | 10/2007 | Knox | ............. | F16G 1/28 474/205 |
| 2009/0142572 A1 * | 6/2009 | Burlett | ............. | B29D 29/08 428/295.1 |
| 2011/0269589 A1 * | 11/2011 | Schleicher | ............. | F16G 1/28 474/205 |
| 2011/0303101 A1 * | 12/2011 | Fan | ............. | A47J 37/045 99/443 C |
| 2012/0108133 A1 * | 5/2012 | Nitta | ............. | B65G 15/38 442/208 |
| 2014/0196663 A1 * | 7/2014 | Kashiyama | ............. | H01L 21/681 118/712 |
| 2014/0378255 A1 * | 12/2014 | Gibson | ............. | F16G 1/08 474/263 |
| 2015/0045501 A1 * | 2/2015 | Jeol | ............. | C08G 73/1042 524/600 |
| 2015/0105198 A1 * | 4/2015 | Yannaji | ............. | F16G 5/20 474/265 |
| 2015/0218357 A1 * | 8/2015 | Feng | ............. | F16G 1/08 428/36.8 |
| 2015/0285334 A1 * | 10/2015 | Thomas | ............. | F16G 1/10 474/90 |
| 2018/0141381 A1 * | 5/2018 | Welles | ............. | B60C 9/0028 |
| 2018/0195579 A1 * | 7/2018 | Shindo | ............. | F16G 5/20 |
| 2018/0251342 A1 * | 9/2018 | Eastman | ............. | B66B 7/062 |
| 2018/0313028 A1 * | 11/2018 | Tomoda | ............. | D06M 13/127 |

FOREIGN PATENT DOCUMENTS

| | | |
|---|---|---|
| EP | 0 838 605 A1 | 4/1998 |
| GB | 2 292 339 A | 2/1996 |
| WO | 2010/066505 A1 | 6/2010 |
| WO | 2013/091808 A1 | 6/2013 |

OTHER PUBLICATIONS

International Preliminary Report on Patentability dated Oct. 4, 2016, issued in corresponding International Application No. PCT/IB2015/052327, filed Mar. 30, 2015, 1 page.
International Search Report dated Jul. 3, 2015, issued in corresponding International Application No. PCT/IB2015/052327, filed Mar. 30, 2015, 3 pages.
Written Opinion of the International Searching Authority dated Jul. 3, 2015, issued in corresponding International Application No. PCT/IB2015/052327, filed Mar. 30, 2015, 5 pages.

* cited by examiner

POWER TRANSMISSION BELT

The present invention relates to the field of power transmission belts.

Figure 1:
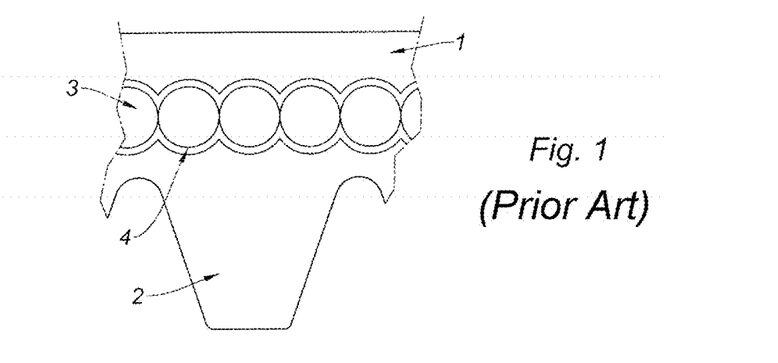
FIG. 1 illustrates a partial view of a power transmission belt according to the prior art.

Such a belt generally comprises a backing layer 1, a ventral layer 2 and a mechanical reinforcement means 3 (FIG. 1).

The ventral layer 2, in this case ribbed, is intended to be put into contact with pulleys. As an example, in the automotive field, a belt may be mounted on a first pulley connected to the axis of the engine and onto a second pulley connected to an alternator.

The mechanical reinforcement means 3 is generally a multi-wire cable, even if other types of reinforcement are possible like a woven reinforcement, a knitted reinforcement or other. Generally, the mechanical reinforcement means 3 gives the possibility of ensuring power transmission of the belt. Most often it is formed in a material, such as polyesters (polyethylene terephthalate (PET), polyethylene naphthalate (PEN), an aromatic polyester (PEAR)), a polyamide, an aramide (aromatic polyamide) or glass fibers.

The backing layer 1 and the ventral layer 2 may be made in an elastomeric material based on alpha-olefin-ethylene (rubber).

In order to manufacture such a belt, the main steps are the following:

a') the backing layer 1, the mechanical reinforcement means 3 and the ventral layer 2 are stacked so as to make a non-vulcanized belt blank; and then, b') vulcanization of the blank is carried out in a mold in order to secure the different layers of the belt blank.

In order to ensure cohesion between the backing layer 1, the mechanical reinforcement means 3 and the ventral layer 2 after vulcanization, an adhesive of the Resorcinol Formaldehyde Latex (RFL; referenced as 4) type is deposited on the cable before step a'). The RFL is obtained by condensation of an aqueous phase preparation (liquid solution) based on a thermosettable resin and on latex. After drying, the elastomeric phase of the latex is bound with the thermosettable resin (the RFL therefore forms an interpenetrated elastomer/thermosettable resin network), and then allows adhesion by means of a reinforcement 3. When the mechanical reinforcement means 3 appears as a cable consisting of several wires, the RFL further gives the possibility of ensuring external cohesion between the different wires.

The vulcanization of the whole (components 1, 2, 3 and 4) allows definitive cohesion. Indeed, during the vulcanization of the belt, the vulcanization ingredients of the rubbers (ventral 1 and backing 2 layers) migrate into the elastomeric phase of the RFL, cross-link the RFL in order to finally generate adhesion between these backing 1 and ventral 2 layers with the reinforcement means 3, treated beforehand with RFL.

The presence of an adhesive of the RFL type is today indispensable in order to ensure the cohesion of the belt and to ensure that it has a satisfactory lifetime.

However, the presence of formaldehyde in the RFL today poses the difficulties considering the environmental constraints.

Indeed, the manufacturers of belts seek to do without the RFL based on formaldehyde, while maintaining the particularly advantageous mechanical properties which the latter give to the lifetime of a belt.

An object of the invention is thus to propose a power transmission belt limiting the presence of RFL at the mechanical reinforcement means, or even suppressing this presence.

Another object of the invention is to propose a method for manufacturing such a belt.

In order to achieve at least one of the objects, the invention proposes a power transmission belt comprising:

a backing layer made in a material with elastomeric behavior;

a ventral layer made in a material with an elastomeric behavior;

a mechanical reinforcement means, for example in a thermoplastic material, interposed between the backing layer and the ventral layer;

characterized in that it comprises a film with thermoplastic transformation surrounding the mechanical reinforcement means, said film comprising at least:

one first component physically and/or chemically bound with at least one component of the backing layer;

one second component physically and/or chemically bound with at least one component of the mechanical reinforcement means; and a third component physically and/or chemically bound with at least one component of the ventral layer.

The invention may also comprise at least one of the following features, taken alone or as a combination:

the backing layer is made in a material with an elastomeric behavior based on alpha-olefin ethylene or based on an olefin TPV and in that the first component of the film with thermoplastic transformation is selected from among homopolymers or copolymers of an olefin, for example polyethylene such as LDPE or HDPE;

the backing layer is made in a material with an elastomeric behavior based on polybutadiene (BR) or based on a styrene-butadiene copolymer (SBR) and in that the first component of the film with thermoplastic transformation is selected from among styrene homopolymers or copolymers, for example polystyrene-b-poly(ethylene-butylene)-b-polystyrene (SEBS) and/or polystyrene-b-polybutadiene-b-polystyrene (SBS);

the backing layer is made in a material with an elastomeric behavior based on polyisoprene or based on natural rubber (NR) and in that the first component of the film with a thermoplastic transformation is polystyrene-b-polyisoprene-b-polystyrene (SIS);

the backing layer is made in a material with an elastomeric behavior based on a copolymer with an ether and ester block (COPE) and in that the first component of the film with thermoplastic transformation is also a copolymer with an ether and ester block (COPE);

the backing layer is made in a material with elastomeric behavior based on a copolymer with an ether and amide block (COPA) and in that the first component of the film with thermoplastic transformation is also a copolymer with an ether and amide block (COPA);

the mechanical reinforcement means is made in a material selected from among a polyamide, a polyester, glass fibers or a material based on cellulose and in that the second component of the film with thermoplastic transformation comprises a material selected from among a polymer containing at least one olefin constitutive unit and a reactive function selected from among a maleic anhydride function, a glycidyl methacrylate function, an acrylic acid function;

the olefin constitutive unit of said polymer containing at least one olefin constitutive unit and a reactive function selected from among a maleic anhydride function, a glycidyl methacrylate function, an acrylic acid function is ethylene;

the mechanical reinforcement means is made in polyamide and in that the second component of the film with thermoplastic transformation comprises a copolymer with an ether and amide block (COPA);

the mechanical reinforcement means is made in polyester and in that the second component of the film with thermoplastic transformation comprises a copolymer with an ether and ester block (COPE);

the ventral layer is made in a material with an elastomeric behavior based on alpha-olefin ethylene or based on an olefin TPV and in that the third component of the film with thermoplastic transformation is selected from among olefin homopolymers or copolymers, for example polyethylene such as LDPE or HDPE;

the ventral layer is made in a material with elastomeric behavior based on polybutadiene (BR) or based on a styrene-butadiene copolymer (SBR) and in that the third component of the film with thermoplastic transformation is selected from styrene homopolymers or copolymers, for example polystyrene-b-poly(ethylene-butylene)-b-polystyrene (SEBS) and/or polystyrene-b-polybutadiene-b-polystyrene (SBS);

the ventral layer is made in a material with elastomeric behavior based on polyisoprene or based on natural rubber (NR) and in that the third component of the film with thermoplastic transformation is polystyrene-b-polyisoprene-b-polystyrene (SIS);

the ventral layer is made in a material with elastomeric behavior based on a copolymer with an ether and ester block (COPE) and in that the third component of the film with thermoplastic transformation is also a copolymer with an ether and ester block (COPE);

the ventral layer is made in a material with elastomeric behavior based on a copolymer with an ether and amide block (COPA) and in that the third component of the film with thermoplastic transformation is also a copolymer with an ether and amide block (COPA);

the backing layer and the ventral layer are made in a material with elastomeric behavior on an identical basis;

the backing layer and the ventral layer are made in a material with elastomeric behavior based on alpha-olefin ethylene, the mechanical reinforcement means is made in polyamide; the film with thermoplastic transformation comprises a first component formed with an olefin homopolymer or copolymer, a second component formed with a copolymer with an ether and amide block (COPA) and/or with a polymer containing at least one olefin constitutive unit and a reactive function selected from among a maleic anhydride function, a glycidyl methacrylate function, an acrylic acid function; a third component formed with an olefin homopolymer or copolymer;

the polyamide is selected from among: PA66, PA46, PA6, aromatic polyamide;

the mechanical reinforcement means is a multi-wire cable, a woven fabric, a non-woven fabric or a knit;

the binding between the film with thermoplastic transformation and at least one of the backing layer or of the ventral layer involves a chemical bond by joint cross-linking;

the belt itself further comprises: a complementary film with thermoplastic transformation, covering the ventral layer and, a textile layer covering the complementary film, the complementary film including: a first component physically and/or chemically bound with at least one component of the ventral layer; a second component physically and/or chemically bound with at least one component of the textile layer;

the bond between the complementary film and the ventral layer involves a chemical bond by joint cross-linking.

In order to attain at least one of these objects, the invention also proposes a method for manufacturing a power transmission belt, characterized in that it comprises the following steps:

a") laying out, in the crude condition, a stack including:
a so-called backing layer;
a first film with thermoplastic transformation, lining the backing layer, and including a component, capable, during step b") of generating a physical and/or chemical bond with at least one component of the backing layer and another capable component, during step b") of generating a physical and/or chemical bond with at least one component of a mechanical reinforcement means, for example in a thermoplastic material;
the mechanical reinforcement means;
a so called ventral layer;
a second film with thermoplastic transformation, lining the ventral layer and including a component capable of generating a physical and/or chemical bond with at least one component of the ventral layer and another component capable of generating a physical and/or chemical bond with at least one component of the mechanical reinforcement means;
this stack forming a belt blank;

b") molding and vulcanizing the belt blank, this step involving the formation of a themoplastic film surrounding the mechanical reinforcement means from the fluidification of said first and second films for ensuring the physical and/or chemical bond between said film with thermoplastic transformation on the one hand and the backing layer, the ventral layer and the mechanical reinforcement means on the other hand.

The method may further comprise the following steps:
at least one of the two films with thermoplastic transformation has self-gripping means for improving the mechanical adhesion of the mechanical reinforcement means, in particular when this mechanical reinforcement means is a multi-wire cable;
both films with thermoplastic transformation have self-gripping means oriented towards the mechanical reinforcement means.

The invention will be better understood and other objects, advantages and features thereof will become more clearly apparent upon reading the following description and which is made with reference to the appended drawings, wherein.

Figure 2:
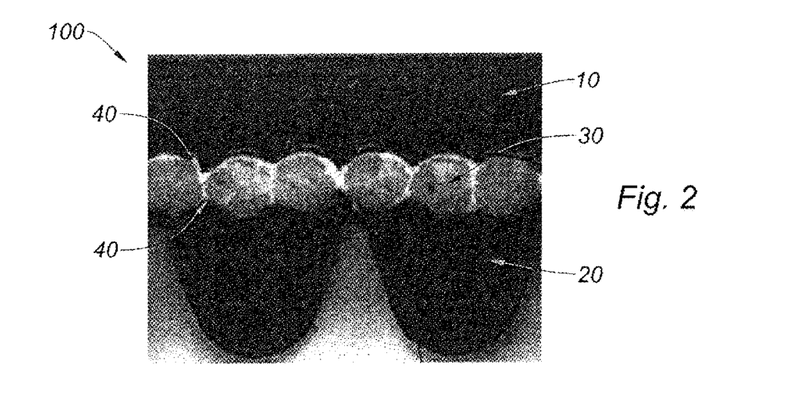
FIG. 2 illustrates a sectional view of a belt according to the invention, obtained after manufacturing.

A power transmission belt according to the invention is illustrated in FIG. 2.

It includes a backing layer 10 in a material with elastomeric behavior based on alpha-olefin ethylene (by basis, it should be understood that the backing layer comprises at least 30% by weight of alpha-olefin-ethylene), a ventral layer 20 in a material with elastomeric behavior based on alpha-olefin-ethylene (the basis of the ventral layer 20 is therefore identical with the basis of the backing layer 10), in this case with a ribbed shape, a mechanical reinforcement means 30, for example in a thermoplastic material, embedded or interposed between the backing layer 10 and the ventral layer 20 and a film 40 with thermoplastic transformation surrounding the mechanical reinforcement means 30.

By film 40 with a thermoplastic transformation, is meant a film 40 formed with a material selected from among thermoplastics (TP), thermoplastic blends, elastomeric thermoplastics (TPE) or TPVs which are elastomeric thermoplastics, wherein the elastomeric phase is cross-linked.

The film 40 with thermoplastic transformation moreover comprises at least:

a first component physically and/or chemically bound with at least one component of the backing layer 10; and a second component physically and/or chemically bound with at least one component of the mechanical reinforcement means 30;

a third component physically and/or chemically bound with at least one component of the ventral layer 20.

Consequently, during vulcanization, adhesion, through the physical and/or chemical bond, is generated between the reinforcement means 30 and the film 40 on the one hand, and between this film 40 with thermoplastic transformation and the ventral 20 and backing 10 layers.

During vulcanization, joint cross-linking by the vulcanization ingredients of the layers 10 and 20, for example peroxides, may complete the adhesion between these layers 10, 20 and the film 40 with thermoplastic transformation.

The lifetime of the belt may then be comparable with a power transmission belt including isocyanate treatment, an RFL and a preparation ensuring the manufacturing adhesive.

The power transmission belt illustrated in FIG. 2 has the following composition.

The backing layer 10 is made in EPDM.

The ventral 20, ribbed layer is made in EPDM.

The mechanical reinforcement means 30 is a multi-wire cable, the wires of which are in polyamide.

The first component of the film 40 with thermoplastic transformation is a low density polyethylene (LDPE).

The second component of the film 40 with thermoplastic transformation is known under the trade name of PEBAX. This is a copolymer with ether and amide blocks (COPA) which contains an amide unit.

The third component of the film 40 with thermoplastic transformation is identical with the first component, which may be contemplated because the backing 10 and ventral 20 layers have a same basis, in this case alpha-olefin-ethylene.

Three preferential chemical compositions (CC) of the film 40 with thermoplastic transformation were tested for checking the benefit of the invention.

They are summarized in table 1.

TABLE 1

| Composition of the film 40 | CC1 | CC2 | CC3 |
|---|---|---|---|
| LDPE (%, by weight) | 60 | 67 | 90 |
| PEBX (%, by weight) | 40 | 33 | 10 |

All these compositions (CC1, CC2, CC3) gave the possibility of obtaining a belt like the one which is illustrated in FIG. 2.

More generally, the ventral 20 and backing 10 layers may be made in any material based on alpha-olefin-ethylene, EPDM only being an example in this family.

The first component of the film 40 with thermoplastic transformation (or which amounts to the same here, the third component of the film 40 with thermoplastic transformation), which is capable, during vulcanization, of generating a physical and/or chemical bond with any material based on alpha-olefin-ethylene of the backing layer 10 (or ventral layer 20), like EPDM, may be selected from among olefin homopolymers or copolymers. Advantageously, this may be a polyethylene, for example low density polyethylene (LDPE) or high density polyethylene (HDPE).

As to the second component of the film 40 with thermoplastic transformation, which is capable during vulcanization of generating a physical and/or chemical bond with the polyamide of the reinforcement means 30, may be selected from among:

(a) the polymers containing a constitutive unit identical with a constitutive unit of the reinforcement;

For the polyamide, this may be a copolymer with an ether and amide block (COPA) which therefore contains an amide unit like polyamide (an example is known under the trade name of PEBAX).

and/or (b) the polymers containing at least one olefin constitutive unit and a reactive function, this reactive function may be selected from the following list:

maleic anhydride function, glycidyl methacrylate function, acrylic acid function.

The olefin constitutive unit may be ethylene.

Optionally, it will be possible to use, in addition to a polymer according to (a) or (b), a terpolymer with polystyrene/polybutadiene-1,4/polymethyl methacrylate, such as the one which is known under the acronym of "SBM" and/or a terpolymer with polym ethyl methacrylate/polybutyl acrylate/methyl methacrylate blocks, such as the one which is known under the acronym of "MAM". This facilitates the mixing of the components (a) and/or (b) and subsequently the shaping of the material.

As a summary, generally, it is possible to define the following materials:

(A) a ventral layer 20 and a backing layer 10 in an elastomeric material based on alpha-olefin-ethylene;

(B) a reinforcement means 30 in polyamide;

(C) a first component and respectively a third component of the film 40 with thermoplastic transformation defined by at least one homopolymer or copolymer of olefins, which is capable during vulcanization of generating a physical and/or chemical bond with the backing layer 10, respectively the ventral layer 20;

(D) a second component of the film 40 with thermoplastic transformation according to (a) and/or (b) above, which is capable, during vulcanization of generating a physical and/or chemical bond with the reinforcement means 30.

The table 1 actually only provides an example.

Polyamide (PA) which is a thermoplastic, may, in particular, but not in a limiting way, be a PA46, PA66, or PA6. This may also be an aromatic polyamide. In the latter case, a COPA as a second component of the film 40 with thermoplastic transformation such as the product known under the trademark of PEBAX, is particularly well adapted.

It should further be noted that the mechanical reinforcement means 30 may be a multi-wire cable made in a material other than polyamide (PA), in any of its forms.

Thus, in the place of the polyamide (PA) (cf. (B) above), it is possible to provide other thermoplastics like polyester, (examples=polyethylene terephthalate (PET), polyethylene naphthalate (PEN), an aromatic polyester) or glass fibers. It is also possible to provide a mixture thereof.

It is also possible to contemplate in the place of PA, a material based on cellulose. This may notably be cellulose, cotton or viscose or a mixture thereof.

Alternatively, it is further possible to contemplate a mixture of a material based on cellulose such as those mentioned earlier, with a thermoplastic material such as those mentioned earlier in order to form this mechanical reinforcement means 30.

As the nature of the material in (B) is modified, interest should focus on the components defined in (D) which are capable, during vulcanization, of generating a physical and/or chemical bond with the relevant material of the reinforcement means 30.

If the reinforcement means 30 is in polyester, it is also possible to provide a second component of the film 40 with thermoplastic transformation according to (a) and/or (b) above.

In the case (a), this is a copolymer with an ether and ester block (COPE) which therefore contains an ester unit like the polyester (an example is known under trade name of Keyflex).

In the case (b), this may notably be a co/ter-polymer based on ethylene grafted with a reactive function such as maleic anhydride, glycidyl methacrylate, acrylic acid.

Optionally, always for the reinforcement means 30 in polyester, it is possible to further use, a terpolymer with polystyrene/polybutadiene-1,4/polymethyl methacrylate blocks, such as the one which is known under the acronym of «SBM» and/or a terpolymer with polymethyl methacrylate/polybutyl acrylate/methyl methacrylate blocks, such as the one which is known under the acronym of «MAM».

If the reinforcement means 30 is in glass fibers, it is possible to provide a second component of the film 40 with thermoplastic transformation according to (b) above.

If the reinforcement means 30 is based on cellulose, it is possible to provide a second component of the film 40 with thermoplastic transformation according to (b) above.

Moreover, in the cases mentioned earlier, we limited ourselves to the case when the ventral 20 and backing 10 layers are made in a material based on alpha-olefin-ethylene, for different conceivable materials for the reinforcement means 30 and the components which may be associated with the film 40 with a thermoplastic formation.

The ventral 20 and backing 10 layers, with an elastomeric behavior, may be produced on the basis of materials other than the materials of the alpha-olefin-ethylene family, from among which:

polybutadiene (known under the acronym of BR for «Butadiene Rubber») and/or the styrene-butadiene copolymer (better known under the acronym SBR for «Styrene-Butadiene Rubber»);
polyisoprene;
natural rubber (better known under the acronym of NR for «Natural Rubber»);
the olefin TPVs (=partly to totally cross-linked elastomeric thermoplastic material);
the COPEs (=copolymer with an ether and ester block);
the COPAs (=copolymer with an ether and amide block).

Thus, if the nature of the material forming the ventral 20 and backing 10 layers are modified (cf. (A) above), interest should be focused on the components of the film 40 with a thermoplastic transformation, defined in (B) which are capable, during vulcanization, of generating a physical and/or chemical bond with the relevant material for these layers 10, 20.

If the backing layer 10, is made in a material with elastomeric behavior based on BR or SBR, then the first component of the film 40 with thermoplastic transformation capable, during vulcanization of generating a physical and/or chemical bond with these BR or SBR materials, may be a styrene homopolymer or copolymer, for example polystyrene-b-poly(ethylene-butylene)-b-polystyrene (better known under the acronym of SEBS) and/or polystyrene-b-polybutadiene-b-polystyrene (better known under the acronym of SBS).

If the backing layer 10 is made in a material with an elastomeric behavior based on polyisoprene or on natural rubber (NR), then the first component of the film 40 with thermoplastic transformation capable, during vulcanization of generating a physical and/or chemical bond with these materials may be polystyrene-b-polyisoprene-b-polystyrene (better known under the acronym of SIS).

If the backing layer 10 is made in a material with elastomeric behavior based on an olefin TPV, then the first component of the film 40 with thermoplastic transformation capable, during vulcanization of generating a physical and/or chemical bond with this material is an olefin homopolymer or copolymer, for example polyethylene (PE), notably low density polyethylene (LDPE).

If the backing layer 10 is made in a material with elastomeric behavior based on a COPE, then the first component of the film 40 with thermoplastic transformation capable, during vulcanization of generating a physical and/or chemical bond with this material is also a COPE.

If the backing layer 10 is made in a material with elastomeric behavior based on a COPA, then the first component of the film 40 with thermoplastic transformation capable, during vulcanization of generating a physical and/or chemical bond with this material is also a COPA.

All these cases described above give the possibility of specifying the first component of the film 40 with thermoplastic transformation according to the nature of the material forming the basis of the material with an elastomeric behavior of the backing layer 10 may be transposed to the third component of the film 40 with thermoplastic transformation according to the nature of the material forming the basis of the material with elastomeric behavior of the ventral layer 20.

For the different materials mentioned above for forming the backing 10 and ventral 20 layers, it is possible to use equally a reinforcement means 30 in polyamide, polyester, glass fibers or based on cellulose as mentioned earlier, with a second component of the film 40 with adequate thermoplastic transformation, as described earlier.

It should be noted that, in all the cases described earlier, the material with an elastomeric behavior of the ventral layer 20 has a basis identical with the material of elastomeric behavior of the backing layer 10. In the case of a basis in alpha-olefin-ethylene, the notion of an identical basis means that the backing layer 10 comprises at least 30% by weight of alpha-olefin-ethylene and that the ventral layer 20 also comprises at least 30% by weight of alpha-olefin-ethylene.

However, the backing layer 10 may be made in a material with elastomeric behavior with a first basis and the ventral layer 20 may be made in a material with elastomeric behavior with a second basis, the second basis being different from the first basis.

For this reason, the film 40 with thermoplastic transformation will generally comprise at least: one first component physically and/or chemically bound with at least one component of the backing layer; a second component physically and/or chemically bound with at least one component of the mechanical reinforcement means 30; and a third component physically and/or chemically bound with at least one component of the ventral layer 20.

The third component of the film 40 with thermoplastic transformation may therefore be distinct from the first component of the film with thermoplastic transformation, in particular when the basis of the material of elastomeric behavior of the ventral layer 20 is distinct from the basis of the material with elastomeric behavior of the backing layer 10. For example, the backing layer 10 may be made in a material with elastomeric behavior based on alpha-olefin-ethylene, the ventral layer 20 in a material with elastomeric behavior based on BR. In this example, the first component of the film 40 with thermoplastic transformation may be selected from among olefin homopolymers or copolymers, for example polyethylene such as LDPE or HDPE, and the third component of the film 40 with thermoplastic transformation is selected from among styrene homopolymers or copolymers. As to the second component of the film 40 with thermoplastic transformation, it is selected according to the material forming the mechanical reinforcement means 30.

However, the third component of the film 40 with thermoplastic transformation, in particular when the basis of the material of elastomeric behavior of the ventral layer 20 is identical with the basis of the material of elastomeric behavior of the backing layer 10. The second component of the film 40 with thermoplastic transformation is then selected according to the material forming the mechanical reinforcement means 30 and, in certain cases, this second component of the film 40 with thermoplastic transformation may be identical with the first and third components of this film 40 (for example, if the backing 10 and ventral 20 layers are made in a material with an elastomeric behavior based on COPE and the mechanical reinforcement means 30 is made in polyester).

Whether the basis of the material with an elastomeric behavior of the ventral layer 20 is different from or identical with the basis of the material of elastomeric behavior of the backing layer 10 does not prevent the presence of other components, in particular components made in a material with elastomeric behavior. As an example, it is possible to provide a backing layer 10, the basis of which is BR and a ventral layer 20 with a same BR basis moreover comprising another material with an elastomeric behavior, such as alpha-olefin-ethylene, SBR, NR, COPE, COPA, polyisoprene or olefin TPV.

The multi-wire cable may be replaced with a woven, a non-woven or a knit, in so far that what is important for ensuring the cohesion between the different elements of the belt is the chemical compatibility between this reinforcement means 30 and the film 40 with thermoplastic transformation.

Moreover, the ribbed shape of the ventral layer 20 is not a limiting factor. This may therefore be a rib with a trapezoidal, striated or other shape. Moreover a ribbed shape is not mandatory. The ventral layer 20 may actually have a notched shape, which gives the possibility of defining a synchronous belt.

Regardless of the materials described earlier, which are compatible for manufacturing a belt according to the invention, the nature of the components comprised in the film 40 with thermoplastic transformation gives the possibility of replacing RFL. However, it is not excluded that such a film 40 be applied in combination with RFL provided in the mechanical reinforcement means 30, even if finally, it is preferable to totally do without the presence of RFL.

Figure 3:
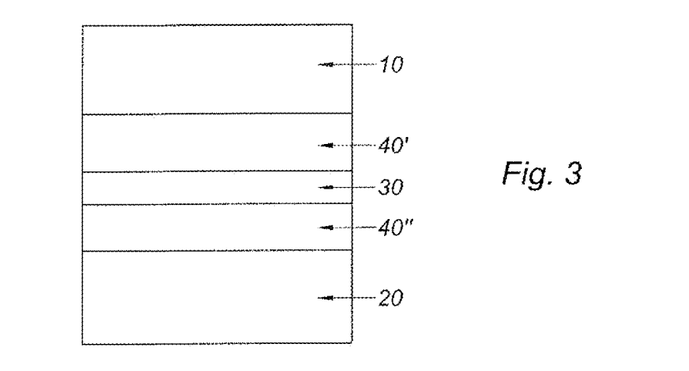
FIG. 3 illustrates, according to a sectional view, a diagram representative of a blank of the belt of FIG. 2 before vulcanization (crude condition), i.e. during manufacturing.

In FIGS. 3 (diagram), 4 (real), 5 (real) and 6 (diagram) is illustrated the structure of a blank of the belt of FIG. 2, before vulcanization.

Figure 4:
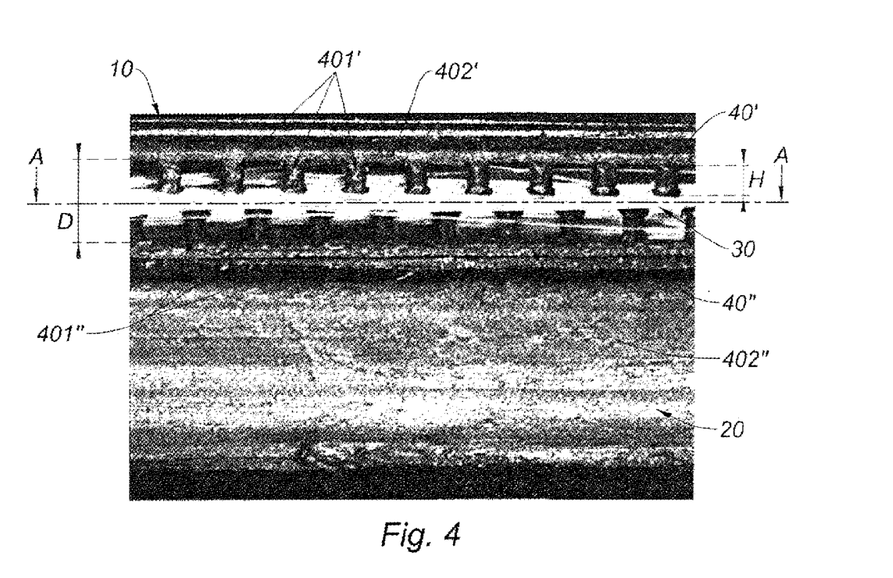
FIG. 4 illustrates a longitudinal sectional view of a belt blank of FIG. 2, this blank being according to the diagram illustrated in FIG. 3.
Figure 5:
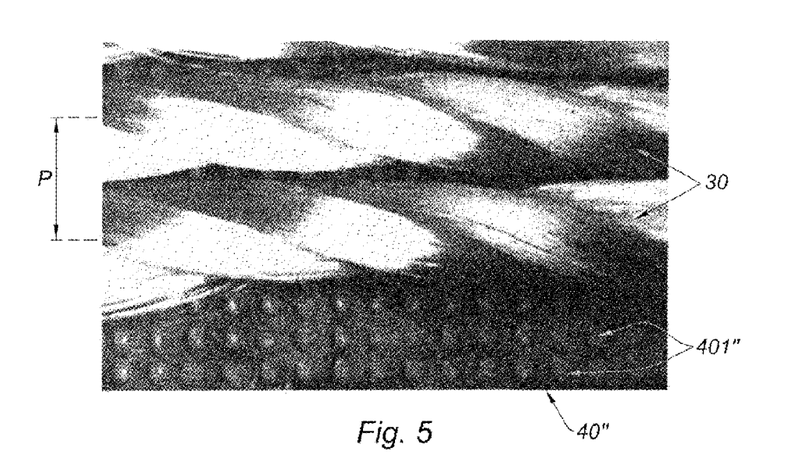
FIG. 5 illustrates a cross-sectional view of FIG. 4, made at the level of a sectional plane A-A.
Figure 6:
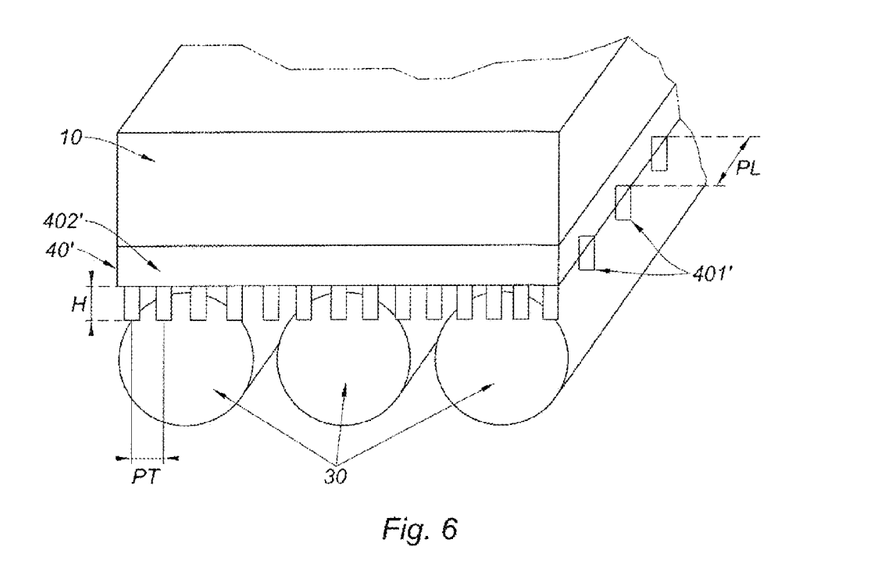
FIG. 6 illustrates, according to a schematic view, the blank of FIG. 4, according to a partial perspective view.

In these figures, the backing layer 10, the ventral layer 20 (not yet ribbed, this operation being carried out subsequently by a molding step, for example with a mold, during the manufacturing method and before vulcanization) and the mechanical reinforcement means 30 are recognized. In FIGS. 4 and 5, it is moreover possible to observe the different wires of the mechanical reinforcement means 30, which is a multi-wire cable.

Practically, the film 40 with thermoplastic transformation is obtained after the made assembly (stack) of FIG. 3 is subject to pressure under a high temperature leading to fluidification of the films 40', 40" with thermoplastic transformation which, upon fluidifying, will coat the reinforcement means 30 and penetrate it. This fluidification of the films 40', 40" will advantageously occur during vulcanization.

More specifically, before vulcanization, the film 40' is lined under hot conditions with the backing layer 10 and the film 40" with the ventral portion 20. The film 40' is therefore the one which comprises a component capable, during vulcanization, of generating a physical and/or chemical bond with at least one component of the backing layer 10 and another component capable, during this vulcanization, of generating a physical and/or chemical bond with a component of the mechanical reinforcement means 30. The film 40" is the one which comprises a component capable, during vulcanization, of generating a physical and/or chemical bond with at least one component of the ventral layer 20 and another component capable, during vulcanization, of generating a physical and/or chemical bond with a component of the mechanical reinforcement means 30.

Both films 40', 40" are shown assembled and held together with the backing and ventral layers in the making step. The making step consists of depositing the assembly (10/40') in a first phase, and then of depositing the reinforcement means 30 and finally depositing the assembly (20/40").

One point to be noted is that the proposed stack gives the possibility of ensuring a making tack which is sufficient for ensuring different handling operations before vulcanization.

Indeed, in order to avoid mis-positioning of the reinforcement means 30 before vulcanization relatively to the backing 10 and ventral 20 layers, it is important to maintain the interdependency of the achieved making.

In the state of the art, several approaches have already been proposed for this purpose.

A first approach of the state of the art consists of using perchloroethylene on the towers for making the belt. A major drawback of this approach is that it practically limits the nature of the conceivable materials for forming the backing and ventral layers, since these layers then have to have a specific composition for interacting with perchloroethylene.

This is not the case within the scope of the invention.

Indeed, the nature of the first and second components of the films 40', 40" gives the possibility of obtaining sufficient tack, since these components are adapted to the nature of the materials forming the backing 10 and ventral layers on the one hand, and the mechanical reinforcement means 30 on the other hand. For example, if the backing 10 and ventral 20 layers are made in EPDM and the mechanical reinforcement means 30 in PA, the first component of the films 40', 40" may be an LDPE (adapted to EPDM and more generally to alpha-olefin-ethylene) and the second component a PEBAX, adapted to PA.

Moreover, such an approach to the state of the art consisting of producing a sheath around the cable coated with RFL exploits the use of materials adapted for ensuring the "tack".

For example, if the backing 1 and ventral 2 layers are made on the basis of alpha-olefin-ethylene, the sheath of the reinforcing means 3 may be an elastomer based on alpha-olefin-ethylene. In practice, a cladding of the reinforcing means 3 is thus achieved by exclusion. This gives the possibility of achieving mechanical clamping of the sheath against the reinforcing means 3. Between the sheath and the backing 1 and ventral 2 layers, sufficient «tack» is then obtained, because of the compatibility of the materials, all made on the basis of alpha-olefin-ethylene, which may be EPDM or EPM.

The approach by cladding gives the possibility of using different elastomeric materials for the backing 1 and ventral 2 layers. For this it is sufficient to have a sheath made in an elastomeric material identical with the one forming said layers 1,2.

However, with the purpose of improving the «tack», the invention proposes an original solution.

Indeed, it is possible to further improve the «tack», in particular at the level of the interface between the films 40', 40" and the mechanical reinforcement means 30, in particular when the latter is formed with a multi-wire or multi-filament cable (which is generally the case) by using a self-gripping agent.

Relatively to the perchloroethylene solution, the use of a self-gripping agent is much more of interest on an environmental level and is not limited to certain compositions of the backing 10 and ventral 20 layers. Moreover, relatively to the so-called «cladding» solution, it does not require the application of an additional step in the manufacturing method.

For this purpose, the films 40', 40" then comprise self-gripping means 401', 401" advantageously oriented towards the mechanical reinforcement means 30, for example perpendicularly relatively to a base 402', 402" of the corresponding film 40', 40".

These self-gripping means 401', 401" may have various shapes, their function being ensuring gripping of the films 40', 40" with the reinforcing means 30, in particular when the latter is formed with wires or filaments. For example, these may be hooks, harpoons, pins and more generally growths advantageously oriented towards the mechanical reinforcement means 30.

These self-gripping means 401', 401" are generally positioned at regular intervals both in the longitudinal plane (plane of FIG. 4) and the transverse plane (plane of FIG. 5).

At this stage of the manufacturing method, the films 40', 40" generally appear on a planar surface.

These self-gripping means 401', 401" have the function of ensuring mechanical adhesion of the wires of the reinforcement means 30 to the films 40', 40".

The making tack is thus improved.

Further, the presence of self-gripping means 401', 401" also improves the initial positioning of the wires of the mechanical reinforcement means 30 relatively to the films 40', 40". This is of particular interest since, by the way, this may give the possibility of doing without any treatment based on toluene and isocyanate generally used for a mechanical reinforcement means treated with RFL. Such a treatment based on toluene and isocyanate actually gives the possibility in the prior art, of penetrating the core of the fibers of the reinforcement means for ensuring cohesion between these fibers.

For this purpose, the height H of the self-gripping means, the longitudinal pitch PL and the transverse pitch PT between two self-gripping means are adjusted according to the geometry and to the nature of the reinforcement means 30 (diameter, the twisting, dimensions of a filament, chemical nature) for guaranteeing the pitch P of the reinforcement means 30 (FIG. 5). The height H is selected in order to avoid any buckling. The transverse pitch PT between two self-gripping means gives the possibility of handling the lateral hold of the reinforcement means. The longitudinal pitch PL between two self-gripping means gives the possibility of handling the holding of the reinforcement means 30 in the longitudinal direction. Depending on the geometry and on the nature of the filament, the intervals PL, PT between each self-gripping means may be different along each of the planes (this is the case on the diagram of FIG. 6).

The presence of self-gripping means 401', 401" is moreover of particular interest for limiting or even suppressing the application of an isocyanate treatment which aims, in the state of the art at stiffening the wires of the mechanical reinforcement means 30 in order to avoid possible unraveling problems. With the self-gripping means, this problem is less present.

Finally, and as explained earlier, it is the attained temperature during vulcanization which allows fluidification of the films 40', 40" so that the latter flow around the cable 30. During vulcanization, the films 40', 40" therefore disappear and only form a single film with a continuous shape 40, as illustrated in FIG. 2.

In addition to the adapted chemical composition of the films 40' and 40" for the targeted application, the method according to the invention therefore applies a use of the films 40', 40" aiming at transforming them into a single film with a continuous shape.

As this has been specified earlier, vulcanization advantageously involves joint cross-linking of the film 40 with thermoplastic transformation being formed with the backing 10 and ventral 20 layers.

For the manufacturing of the belt illustrated in FIG. 2, vulcanization was carried out at the temperature T=183° C. More generally, a vulcanization temperature comprised between 150° C. to 210° C. may be contemplated.

For a summary, the manufacturing method therefore comprises the following steps:
a") laying out, in the crude condition, a stack including:
 a so-called backing layer 10;
 a first film 40' with thermoplastic transformation, lining the backing layer 10, and including a component capable, during step b"), of generating a physical and/or chemical bond with at least one component of the backing layer 10 and another component capable, during step b"), of generating a physical and/or chemical bond with at least one component of a mechanical reinforcement means 30, for example in a thermoplastic material;

the mechanical reinforcement means 30;

a so called ventral layer 20;

a second film 40" with thermoplastic transformation, lining the ventral layer 20, and including a component capable of generating a physical and/or chemical bond with at least one component of the ventral layer 20 and another component capable of generating a physical and/or chemical bond with at least one component of the mechanical reinforcement means 30;

this stack forming a belt blank;

b") molding and vulcanizing the belt blank, this step involving the formation of a film 40 with thermoplastic transformation surrounding the mechanical reinforcement means 30 from the fluidification of said first and second films 40', 40" in order to ensure the physical and/or chemical bond between said film 40 with thermoplastic transformation on the one hand and the backing layer 10, the ventral layer 20 and the mechanical reinforcement means 30 on the other hand.

This method according to the invention may be applied for each set of materials capable of generating a physical and/or chemical bond as described earlier.

Figure 7:
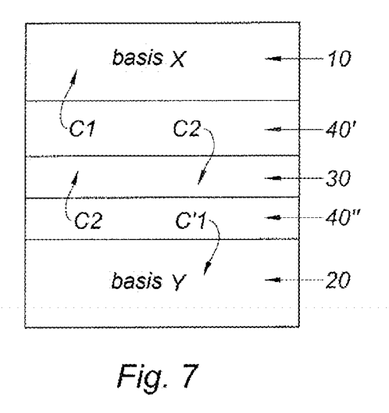
FIG. 7 is diagram according to the diagram of FIG. 3, in which are specified different conceivable materials.

FIG. 7 illustrates according to a sectional view, the belt blank of FIG. 3, on which the different components which may form this blank are specified. Thus, the backing layer 10 is made in a material of elastomeric behavior based on a material X. The ventral layer 20 is made with a material of elastomeric behavior based on a material Y, Y may be either identical with or different from X. The film 40' comprises a component C1 capable of physically and/or chemically binding to the backing layer 10, advantageously with the basis X.

The film 40" comprises a component C'1 capable of physically and/or chemically binding to the ventral layer 20, advantageously with the basis Y; C'1 may either be identical or not with C1 as explained earlier. Each of the two films 40', 40" also comprise a component C2 capable of physically and/or chemically binding to the reinforcement means 30.

Figure 8:
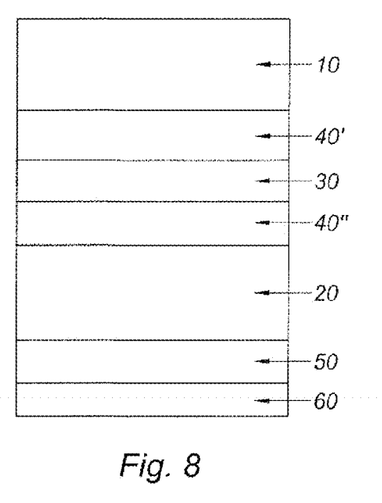
FIG. 8 illustrates, according to a sectional view, a diagram representative of a belt blank similar to the one of FIG. 2, but further including an external textile layer covering the ventral layer and intended to be in contact with pulleys of a driving system.

FIG. 8 illustrates, according to a sectional view, a diagram representative of a belt blank similar to the one of FIG. 3, but additionally including an external textile layer 60 covering the ventral layer 20, via a complementary film.

The complementary film 50 allows cohesion with the textile layer 60 and the ventral layer 20.

As this has been specified earlier, the ventral layer 20 is made in a material of elastomeric behavior which may be based on alpha-olefin-ethylene, BR, SBR, polyisoprene, NR, olefin TPV, COPE or COPA.

The textile layer 60 may be woven or non-woven.

The textile layer 60 may be made in a thermoplastic material. Among the conceivable thermoplastic materials for forming this textile layer 60, it is possible to select any of the materials listed earlier for the mechanical reinforcement means 30, i.e. polyamide (PA46, PA66, PA6, aromatic polyamide), polyester (PET, PEN, aromatic polyester), glass fibers or a mixture thereof.

It is further possible to provide a material based on cellulose (cellulose, cotton, viscose or a mixture thereof).

It is also possible to provide two-component materials formed with a core in a first material, for example thermoplastic material, coated with a sheath in another material, for example a thermoplastic material. Thus, as examples the following core/sheath pairs may be contemplated: PET/PE, PA/PE, glass fibers/PE, cellulose-based material/PE.

The complementary film 50 is advantageously made according to either one of the films 40', 40" as regards the structure.

Regarding this structure, the complementary film 50 may thus be provided with or without self-gripping means. Advantageously, self-gripping means will however be provided on the complementary film. In all cases notably when self-gripping means are provided, the complementary film 50 is laid out, in the stack illustrated in FIG. 8, according to the film 40' illustrated in FIG. 4, so as to be put into contact with the textile layer 60.

Consequently, before vulcanization, maintaining the textile layer 60 in position relatively to the complementary film 50 is ensured.

The complementary film 50 is also advantageously made according to either one of the films 40', 40" as regards the conceivable materials.

Thus, the complementary film 50 is a film with thermoplastic transformation including:

a first component capable, during vulcanization, of generating a physical and/or chemical bond with at least one component of the ventral layer 20; and a second component capable, during vulcanization, of generating a physical and/or chemical bond with at least one component of the textile layer 60.

The bond between the complementary film 50 and the ventral layer 20 may involve a chemical bond by joint cross-linking, notably with ingredients of the peroxide type of the ventral layer 20.

The first component of the complementary film 50 may be an olefin homopolymer or copolymer (LDPE, for example), a styrene homo- or co-polymer (SEBS or SBS, for example), an SIS, a COPE or further a COPA according to the material on which is based the ventral layer 20 and according to what has been described earlier for the film 40.

The second component of the complementary film 50 may be selected according to (a) and/or (b) according to the material forming the textile layer 60, as this was described earlier.

By this means, cohesion between the ventral layer 20, the complementary film 50 and the textile layer 60 is ensured giving this belt a lifetime fitting the requirements. This cohesion is achieved without the presence of RFL.

The invention claimed is:

1. A power transmission belt comprising:
    a backing layer made in a material with an elastomeric behavior;
    a ventral layer made in a material with an elastomeric behavior;
    a mechanical reinforcement means interposed between the backing layer and the ventral layer;
    a film with thermoplastic transformation surrounding the mechanical reinforcement means, said film comprising at least:
    one first component physically and/or chemically bound with at least one component of the backing layer;
    one second component physically and/or chemically bound with at least one component of the mechanical reinforcement means; and
    one third component physically and/or chemically bound with at least one component of the ventral layer.

2. The belt according to claim 1, wherein the backing layer is made in a material with elastomeric behavior based on alpha-olefin-ethylene or based on an olefin TPV and the first component of the film with thermoplastic transformation is selected from the group consisting of olefin homopolymers, olefin copolymers, polyethylene, LDPE, and HDPE.

3. The belt according to claim 1, wherein the backing layer is made in a material with elastomeric behavior based on polybutadiene (BR) or based on styrene-butadiene copolymer (SBR) and the first component of the film with thermoplastic transformation is selected from the group consisting of styrene homopolymers, styrene copolymers, polystyrene-b-poly(ethylene-butylene)-b-polystyrene (SEBS), and polystyrene-b-polybutadiene-b-polystyrene (SBS).

4. The belt according to claim 1, wherein the backing layer is made in a material with elastomeric behavior based on polyisoprene or based on natural rubber (NR) and the first component of the film with thermoplastic transformation is polystyrene-b-polyisoprene-b-polystyrene (SIS).

5. The belt according to claim 1, wherein the backing layer is made in a material with elastomeric behavior based on a copolymer with ether and ester blocks (COPE) and the first component of the film with thermoplastic transformation is also a copolymer with ether and ester blocks (COPE).

6. The belt according to claim 1, wherein the backing layer is made in a material with elastomeric behavior based on a copolymer with ether and amide blocks (COPA) and the first component of the film with thermoplastic transformation is also a copolymer with ether and amide blocks (COPA).

7. The belt according to claim 1, wherein the mechanical reinforcement means is made in a material selected from the group consisting of a polyamide, a polyester, glass fibers a material based on cellulose, and the second component of the film with thermoplastic transformation comprises a material selected from among a polymer containing at least one olefin constitutive unit and a reactive function selected from among a maleic anhydride function, a glycidyl methacrylate function, an acrylic acid function.

8. The belt according to claim 7, wherein the olefin constitutive unit of said polymer contains at least one olefin constitutive unit and a reactive function selected from among a maleic anhydride function, a glycidyl methacrylate function, an acrylic acid function is ethylene.

9. The belt according to claim 1, wherein the mechanical reinforcement means is made in polyamide and the second component of the film with thermoplastic transformation comprises a copolymer with ether and amide blocks (COPA).

10. The belt according to claim 1, wherein the mechanical reinforcement means is made in polyester and the second component of the film with thermoplastic transformation comprises a copolymer with ether and ester blocks (COPE).

11. The belt according to claim 1, wherein the ventral layer is made in a material with elastomeric behavior based on alpha-olefin-ethylene or based on olefin TPV and the third component of the film with thermoplastic transformation is selected from the group consisting of olefin homopolymers, olefin copolymers, polyethylene, LDPE, and HDPE.

12. The belt according to claim 1, wherein the ventral layer is made in a material with elastomeric behavior based on polybutadiene (BR) or based on styrene-butadiene copolymer (SBR) and the third component of the film with thermoplastic transformation is selected from the group consisting of styrene homopolymers, styrene copolymers, polystyrene-b-poly(ethylene-butylene)-b-polystyrene (SEBS), and polystyrene-b-polybutadiene-b-polystyrene (SBS).

13. The belt according to one of claim 1, wherein the ventral layer is made in a material with elastomeric behavior based on polyisoprene or based on natural rubber (NR) and the third component of the film with thermoplastic transformation is polystyrene-b-polyisoprene-b-polystyrene (SIS).

14. The belt according to claim 1, wherein the ventral layer is made in a material with elastomeric behavior based on a copolymer with ether and ester blocks and the third component of the film with thermoplastic transformation is also a copolymer with ether and ester blocks (COPE).

15. The belt according to claim 1, wherein the ventral layer is made in a material with elastomeric behavior based on a copolymer with ether and amide blocks (COPA) and the third component of the film with thermoplastic transformation is also a copolymer with ether and amide blocks (COPA).

16. The belt according to claim 1, wherein the backing layer and the ventral layer are made in a material with elastomeric behavior with an identical basis.

17. The belt according to claim 16, wherein:
the backing layer and the ventral layer are made in a material with elastomeric behavior based on alpha-olefin-ethylene;
the mechanical reinforcement means is made in polyamide; and
the film with thermoplastic transformation comprises:
a first component formed with an olefin homopolymer or copolymer,
a second component formed with a copolymer with ether and amide blocks (COPA) and/or with a polymer containing at least one olefin constitutive unit and a reactive function selected from among a maleic anhydride function, a glycidyl methacrylate function, an acrylic acid function; and
a third component formed with an olefin homopolymer or copolymer.

18. The belt according to claim 17, wherein the polyamide is selected from among: PA66, PA46, PA6, aromatic polyamide.

19. The belt according to claim 1, wherein the mechanical reinforcement means is one of a multi-wire cable, a woven, a non-woven or a knit.

20. The belt according to claim 1, wherein the bond between the film with thermoplastic transformation and at least one of the backing layer or of the ventral layer involves a chemical bond by joint cross-linking.

21. The belt according to claim 16, comprising:
a complementary film with thermoplastic transformation, covering the ventral layer and a textile layer covering the complementary film, the complementary film including:
a first component physically and/or chemically bound with at least one component of the ventral layer; and
a second component physically and/or chemically bound with at least one component of the textile layer.

22. The belt according to claim 21, wherein the bond between the complementary film and the ventral layer involves a chemical bond by joint cross-linking.

* * * * *

UNITED STATES PATENT AND TRADEMARK OFFICE
CERTIFICATE OF CORRECTION

PATENT NO. : 10,267,380 B2  
APPLICATION NO. : 15/301017  
DATED : April 23, 2019  
INVENTOR(S) : E. Franchini et al.

Page 1 of 1

It is certified that error appears in the above-identified patent and that said Letters Patent is hereby corrected as shown below:

On the Title Page

| Column | Line | | |
|---|---|---|---|
| (72) Column 1 | 1 Inventors | | "Chalette sur Loing" should read --Chalette Sur Loing-- |
| (72) Column 1 | 2 Inventors | | "Saint Cyr sur Loire" should read --Saint Cyr Sur Loire-- |

In the Claims

| 15 (Claim 7, Line 3) | 31 | "fibers a" should read --fibers or a-- |
| 16 (Claim 13, Line 1) | 4 | "to one of Claim" should read --to Claim-- |

Signed and Sealed this  
Fifth Day of May, 2020

Andrei Iancu  
*Director of the United States Patent and Trademark Office*